US005488495A

United States Patent [19]

Numao

[11] Patent Number: 5,488,495

[45] Date of Patent: Jan. 30, 1996

[54] DRIVING METHOD FOR A FERROELECTRIC LIQUID CRYSTAL DISPLAYS HAVING NO CHANGE DATA PULSES

[75] Inventor: Takaji Numao, Tenri, Japan

[73] Assignee: Sharp Kabushiki Kaisha, Osaka, Japan

[21] Appl. No.: 56,948

[22] Filed: May 5, 1993

Related U.S. Application Data

[63] Continuation of Ser. No. 759,780, Sep. 13, 1991, abandoned, which is a continuation of Ser. No. 670,388, Mar. 15, 1991, abandoned, which is a continuation of Ser. No. 238,860, Aug. 31, 1988, abandoned.

[30] Foreign Application Priority Data

Aug. 31, 1987 [JP] Japan .................................. 62-218290

[51] Int. Cl.$^6$ .............................. G02F 1/141; G09G 3/36

[52] U.S. Cl. ................................................ 359/56; 345/97

[58] Field of Search ................................ 350/331 R, 332, 350/333, 350 S; 340/784, 805, 799; 359/56; 345/97, 98, 100

[56] References Cited

U.S. PATENT DOCUMENTS

| | | | |
|---|---|---|---|
| 4,685,769 | 8/1987 | Fukuma et al. | 350/333 |
| 4,701,026 | 10/1987 | Yazaki et al. | 350/333 |
| 4,709,995 | 12/1987 | Kuribayashi et al. | 350/333 |
| 4,743,096 | 5/1988 | Wakai et al. | 350/333 |
| 4,746,196 | 5/1988 | Umeda et al. | 350/333 |
| 4,770,502 | 9/1988 | Kitazima et al. | 350/333 |
| 4,773,716 | 9/1988 | Nakanowatari | 350/333 |
| 4,836,656 | 6/1989 | Mouri et al. | 350/333 |
| 4,864,290 | 9/1989 | Waters | 340/784 |
| 4,904,064 | 2/1990 | Lagerwall et al. | 350/350 S |

FOREIGN PATENT DOCUMENTS

| | | | |
|---|---|---|---|
| 0092921 | 4/1987 | Japan | 350/333 |
| 0165631 | 7/1987 | Japan | 350/333 |

OTHER PUBLICATIONS

Wahl et al "Experimental Driver and Addressing Techniques for Ferroelectric Liquid Crystal Driver" J. Phys. E. Sci. Instrum. 21–1988–pp. 460–466.

*Primary Examiner*—William L. Sikes
*Assistant Examiner*—Tai V. Duong

[57] ABSTRACT

A ferroelectric liquid crystal display system suited for use in a matrix liquid crystal display device includes scanning electrodes Lp (p=1, 2, . . . m, wherein m is a positive integer) and signal electrodes arranged so as to intersect with the scanning electrodes in the form of a matrix of columns and rows. Further, a picture element is disposed at each point of intersection between the scanning and signal electrodes. The ferroelectric liquid crystal display system is characterized in the provision of a device for indicating which one of bright and dark displays each picture element on the selected scanning electrode has previously effected. It is so designed that a voltage to be applied to the picture element in the event that a dark display should be effected while a bright display has previously been effected or a bright display should be effected while a dark display has previously been effected, and a voltage to be applied to the picture element Akj on the non-selected scanning electrodes Lk at particular cases, are so selected as to give a significant difference enough to avoid any possible optical adverse influence which may act on the picture element then held in a bright or dark memory state.

5 Claims, 10 Drawing Sheets

B : Bright

D : Dark

B : Bright

D : Dark

DRIVING METHOD FOR A FERROELECTRIC LIQUID CRYSTAL DISPLAYS HAVING NO CHANGE DATA PULSES

This application is a continuation of application Ser. No. 07/759,780 filed on Sep. 13, 1991, which is a continuation of Ser. No. 07/670,388 filed on Mar. 15, 1991, which is a continuation of Ser. No. 07/238,860, filed on Aug. 31, 1988; all of which are now abandoned.

BACKGROUND OF THE INVENTION

1. Field of the Invention

The present invention relates to a liquid crystal display driving system suited for use in a liquid crystal display device utilizing a ferroelectric liquid crystal.

2. Description of the Prior Art

FIG. 8 of the accompanying drawings schematically illustrates a liquid crystal display device 1 referred to both in the description of the prior art and the description of an embodiment of the present invention. The illustrated liquid crystal device 1 comprises a number m of scanning electrodes L1, L2, . . . , Lm (hereinafter, these scanning electrodes being collectively referred to by L) and a number n of signal electrodes S1, S2, . . . , Sn (hereinafter, these signal electrodes being collectively referred to by S). The sets of electrodes are laid so as to intersect with each other in the form of a matrix of columns and rows. A picture element Apj (p=l, 2, . . . , m, and j=l, 2, . . . , n) made of ferroelectric liquid crystal is disposed at each point of intersection of the scanning and signal electrodes L and S. The scanning electrodes L are applied with respective voltages, of arbitrary level, from a scanning electrode drive circuit 2. Further, the signal electrodes S are applied with respective voltages of arbitrary level from a signal electrode drive circuit 3.

The liquid crystal display device 1 utilizing the ferroelectric liquid crystal exhibits such a characteristic that, when a voltage exceeding a predetermined positive first defined voltage Va is applied to an arbitrary picture element Apj for a length of time greater than the unit time r (second), the picture element Apj is in a bright memory state. However, when a voltage not higher than a predetermined negative second defined voltage −Vb is applied to an arbitrary picture element Apj for a length of time greater than the unit time r (second), the picture element Apj is in a dark memory state.

FIGS. 9 and 10 are diagrams showing waveforms used to describe the principle of the liquid crystal driving system according to a typical prior device.

(1) and (2) shown in FIG. 9 illustrate selection voltages D1p and non-selection voltage H1k applied to an arbitrary scanning electrode Lp (p=l, 2, . . . m) and to the other scanning electrodes Lk (k≠p) than the scanning electrode Lp, respectively, during a selection period Tap in which the arbitrary scanning electrode Lp is selected. The selection period Tap is set to be of a length four times the unit time, that is 4 r. The initial unit time r during this selection period Tap is hereinafter referred to as a first time span r1. Similarly, the subsequent second to fourth unit time r during the selection period Tap are hereinafter referred to as second to fourth time span r2 to r4, respectively.

In the selection voltage D1p shown by (1) in FIG. 9, a voltage V1 is set in the first and fourth time spans r1 and r4 of the selection period Tap and a voltage V8 is set in the second and third time spans r2 and r3 of the selection period Tap. On the other hand, in the non-selection voltage H1K shown by (2) in FIG. 9, a voltage V6 is set in the first and fourth time spans r1 and r4 of the selection period Tap and a voltage V3 is set in the second and third time spans r2 and r3 during the selection period Tap. It is to be noted that the voltages V1 and V8 in the selection voltage D1p and the voltages V3 and V6 in the non-selection voltage H1K have the following respective relationships.

$$V8=-V1 \tag{1}$$

$$V6=-V3 \tag{2}$$

(3) and (4) shown in FIG. 9 illustrate respective waveforms of a write voltage W1 and an erase voltage E1 applied to an arbitrary signal electrode Sj (j=1, 2, 3, . . . , n) during the selection period Tap in which the scanning electrode Lp is selected. The arbitrary electrode Sj is always applied with either the write voltage W1 or the erase voltage El. When the selection voltage D1p is applied to a scanning electrode, the write voltage W1 is applied to a scanning electrode, and the relevant picture element is set in a bright memory state, but in the event that the erase voltage El is applied, the relevant picture element is set in a dark memory state.

The write voltage W1 shown by (3) in FIG. 9 is set to a voltage V5, V4, V2 or V7 during the first time span r1, the second time span r2, the third time span r3 or the fourth time span r4, respectively, of the selection period Tap. On the other hand, the erase voltage E1 shown by (4) in FIG. 9 is set to a voltage V7, V2, V4 or V5 during the time span r1, r2, r3 or r4, respectively, of the selection period Tap. It is to be noted that the voltages V5, V4, V7 and V2 to which the write voltage W1 and the erase voltage E1 are set have the following relationships.

$$V5=-V4 \tag{3}$$

$$V7=-V2 \tag{4}$$

(1) shown in FIG. 10 illustrate a waveform of a write driving voltage Wpj applied to the picture element Apj when, during the selection period Tap, the selection voltage D1p and the write voltage W1 are applied to the scanning electrode Lp and the signal electrode Sj, respectively.

This write driving voltage Wpj is set by a difference between the selection voltage D1p and the write voltage W1. Further, it is of a level where the voltage level (V1–V7) of the fourth time span r4 exceeds the first defined voltage Va. Accordingly, the picture element Apj is in the bright memory state during this selection period Tap. It is to be noted that the voltage levels during the first time span r1 and the fourth time span r4 can be expressed as follows in consideration of the equations (1) to (4);

$$V8-V4=-(V1-V5) \tag{5}$$

$$V8-V2=-(V1-V7) \tag{6}$$

and, accordingly, a direct current component during the selection period Tap can be cancelled.

(2) shown in FIG. 10 illustrates a waveform of a leakage voltage Mkj applied to a picture element Akj in the event that, during the selection period Tap, the non-selection voltage H1K and the write voltage W1 are respectively applied to the scanning electrode Lk and the signal electrode Sj. The voltage level of leakage voltage Mkj during the first time span r1 to the fourth time span r4 can be expressed as follows consideration of the equations (1) to (4);

$$V6-V5=-(V3-V4) \tag{7}$$

$$V3-V2=-(V6-V7) \quad (8)$$

and, accordingly, a direct current component of the applied voltage Mkj during this selection period Tap can be cancelled.

(3) shown in FIG. 10 illustrates a waveform of an erase driving voltage Epj applied to the picture element Apj in the event that, during the selection period Tap, the selection voltage D1p and the erase voltage E1 are applied respectively to the scanning electrode Lp and the signal electrode $S_j$. This erase driving voltage $E_{pj}$ is set so that the voltage level (V1–V5) in the fourth time span r4 does not exceed the first defined voltage $V_a$. In the liquid display device 1 using normal ferroelectric liquid crystals, because the value of the second defined voltage $-V_b$ falls, in the absolute value, within the range of 0.8 to 1.2 times the first defined voltage $V_a$, when the voltage (V8–V2) is applied in the second time span r2, and the voltage (V8–V4) is applied in the third time span r3, it is like a voltage of 1.2 times (V8–V2) being applied during the unit time span r. Thereby, the picture element is put in a dark memory state, (4) shown in FIG. 10 illustrates a waveform of a leakage voltage Nkj applied to the picture element Apj in the event that, during the selection period Tap, the non-selection voltage H1K and the erase voltage E1 are applied respectively to the scanning electrode Lk and the signal electrode Sj.

As is the case with the write driving voltage Wpj and the leakage voltage Mkj shown by (1) and (2) in FIG. 10, respectively, respective direct current components of the erase driving voltage Epj and the leakage voltage Nkj are cancelled.

FIG. 11 is a diagram showing waveforms of voltages applied to the liquid crystal display device 1 according to the typical prior art liquid crystal driving system. It is to be noted that, for the sake of brevity, the liquid crystal display device 1 is shown as having 4×4 picture elements Apj (p, j=1, 2, 3, 4).

(1) and (2) shown in FIG. 11 represent respective waveforms of voltages VL1 and VL2 applied to the scanning electrodes L1 and L2. Further, and (4) shown in FIG. 11 represent respective waveforms of voltages VS1 and VS2 applied to the signal electrodes S1 and S2. Dependent upon the voltages VL1 and S1 applied respectively to the scanning electrode L1 and the signal electrode S1, a voltage (VL1–VS1) of a waveform shown by (4) in FIG. 11 is applied to the picture element A11. Similarly, voltages (VL2–VS1) and (VL1–VS2) of waveforms shown by (5) and (7) in FIG. 11 are applied to the picture elements A21 and A12, respectively.

It is to be noted that, during the time period from the timing t0 to the timing t4, selection periods Ta1 to Ta4 are defined during which the scanning electrodes L1 to L4 are respectively selected. By way of example, during the selection period Ta1, the picture element A11 is set in the dark memory state and the picture element A12 is set in the bright memory state.

FIG. 12 is a diagram showing waveforms used to describe the principle of another prior art liquid crystal driving system.

(1) to (4) shown in FIG. 12 represent waveforms of a selection voltage D2p, a non-selection voltage H2k, a write driving voltage W2 and an erase driving voltage E2 which correspond to the waveforms (1) to (4) shown in FIG. 9, respectively. In this driving system, the selection period Tbp during which arbitrary scanning electrodes Lp (p=1, 2, 3, . . . , m) are selected is set to be twice the previously mentioned unit time r, that is, 2 r seconds.

FIG. 13 is a diagram showing respective waveforms of voltages applied according to the waveforms shown in FIG. 12 to the liquid crystal display device 1 of a construction including the 4×4 picture elements Apj (p, j=l, 2, 3, 4). (1) to (7) shown in FIG. 13 represent respective waveforms of voltages which correspond respectively to the waveforms (1) to (7) shown in FIG. 11. In this driving system, each selection period Tb1 to Tb4 shown from the timing t7 to the timing t11 is set to be twice the unit time. That is, 2 r, the write/erase operation of each of the picture elements is reduced to half that required in the previously mentioned first driving system.

In the event that the same picture is continuously displayed by the former driving system, and if the liquid crystal display device 1 utilizing the ferroelectric liquid crystal is of a construction employing the 4×4 picture elements, such a voltage as shown by (4) in FIG. 11 is applied to the picture element which maintains a dark display. The relationship between this applied voltage and the brightness of the picture element is shown by (1) and (2) in FIG. 14. Since the voltage applied to the picture element A11, during the period Ta1 in which the selection voltage D1p is applied to the scanning electrode L1, once exceeds the voltage Va with which the picture element is set in the bright memory state, and then causes the picture element to be in the dark memory state, the brightness of such picture element exhibits a peak A.

A time span TF1 from the occurrence of this peak A to the next succeeding occurrence of a peak A coincides with the time span from the selection of the scanning electrode L1 to the next succeeding selection of the same scanning electrode L1. Using the time 4 r (s) during which the scanning electrode Lp is selected and the number m of the scanning electrodes, the following relationship can be established.

$$TF1=4r\times m \quad (9)$$

Since human eyes are sensitive to light of a frequency higher than 1/60 second, the following condition has to be satisfied in order for the light not to be perceived.

$$TF1=4r\times m\leqq 1/60 \quad (10)$$

While in the example of FIG. 4 there will be no problem since the number m is 4, the unit timer (s) required to change the memory state when the number m is 200 will be as expressed below:

$$r\leqq 1/60\times 1/4m\approx 20.8\ (\mu s) \quad (11).$$

This is a value difficult for the existing ferroelectric liquid crystal to achieve. The reality is that, since the unit time r is about equal to 100 μs, the number m of the scanning electrodes that can be displayed is about 41, to wit:

$$m\leqq 1/60\times 1/4r\approx 41.7 \quad (12).$$

Also, such a voltage as shown by (7) in FIG. 11 is applied to the picture element which continues a bright display. The relationship between this applied voltage and the brightness of the picture element is such as shown by (3) and (4) in FIG. 14, similarly exhibiting a peak B. Therefore, TF1 must be smaller than 1/60 (s).

In the event that the same picture is continuously displayed by the latter driving system, and if the liquid crystal display device 1 utilizing the ferroelectric liquid crystal is of a construction employing the 4×4 picture elements, such a voltage as shown by (4) in FIG. 13 is applied to the picture element which continues a dark display. The relationship between this applied voltage and the brightness of the picture element is shown by (1) and (2) in FIG. 15. In this case, although the picture element need not be set in the bright memory state, a peak C occurs in the brightness thereof. In such case, the time span TF2 from the occurrence of this peak C to the next succeeding occurrence of a peak C, the time period 2 r (s) during which the scanning electrode Lp is selected, and the number m of the scanning electrodes give the following relationship:

$$TF2=2\ r\times \qquad (13).$$

Accordingly, when the number m is 200, the unit time r gives the following relationship:

$$r\leqq 1/60\times 1/2m\ 41.3\ (\mu s) \qquad (14).$$

Even this is a value difficult for the existing ferroelectric liquid crystal to achieve. Conversely, when the unit time r is chosen to be 100 μm, the number m of the scanning electrodes will be about 83, to wit:

$$m\leqq 1/60\times 1/2r\leqq 83.3 \qquad (15).$$

Also, such a voltage shown by (7) in FIG. 13 is applied to the picture element which continues a bright display. The relationship between this applied voltage and the brightness of the picture element gives such as shown by (3) and (4) in FIG. 15. This results in the occurrence of a peak D in the brightness, requiring TF2 to be smaller than 1/60 (s).

SUMMARY OF THE INVENTION

The present invention provides a ferroelectric liquid crystal display system suited for use in a matrix liquid crystal display device in which a ferroelectric liquid crystal is filled. It further includes a plurality of scanning electrodes Lp (p=l, 2, . . . m, wherein m is a positive integer) and a plurality of signal electrodes arranged so as to intersect with the scanning electrodes in the form of a matrix of columns and rows. Further, a picture element Apj (j=1, 2, . . . n, wherein n is a positive integer) disposed at each point of intersection between the scanning electrodes and the signal electrodes. The ferroelectric liquid crystal display system of the present invention is characterized in that it includes a device for indicating which one of bright and dark displays each picture element Apj on the respective scanning electrode then selected has previously effected. The system is further designed so that a voltage to be applied to the picture element Apj, in the event that a dark display should be effected while a bright display has previously been effected, or a bright display should be effected while a dark display has previously been effected, and a voltage to be applied to the picture element Akj on the scanning electrodes Lk, then not selected, (X) in the event that the bright display should be effected while the dark display has previously been effected, (Y) in the event that the dark display should be effected while the bright display has previously been effected, or (Z) in the event that the bright display should be effected while the bright display has previously been effected, or the dark display should be effected while the dark display has previously been effected are so selected as to give a significant difference enough to avoid any possible adverse optical influence which may act on the picture element then held in a bright or dark memory state, and thereby to eliminate flicker synchronization with the frame frequency for solution of the conventional problem.

While according to the prior art, because the flicker synchronizing with the frame frequency takes place, the number m of the scanning electrodes has been fixed in consideration of the necessity in which, in order for a viewer not to perceive a flicker, the frame frequency must be equal to or higher than 60 (Hz). The present invention makes it possible to use the frame frequency of about 10 (Hz) without permitting the viewer, then watching the picture element kept continuously in the bright or dark memory state, to perceive the occurrence of flickering. In the present invention, because no rewriting is effected unless the display state of a picture element is changed, no optical peak will take place. Further, when the display state of a picture element is changed, the optical peak takes place irrespective of the frame frequency. Accordingly, no flicker synchronizing with the frame frequency will take place. With the present invention, the necessity of fixing the frame frequency to a value equal to or higher than 60 (Hz) needs no longer to be applied. Therefore, the number m of the scanning electrodes can be arbitrarily chosen.

BRIEF DESCRIPTION OF THE DRAWINGS

This and other objects and features of the present invention will become clear from the following detailed description taken in conjunction with a preferred embodiment thereof with reference to the accompanying drawings, in which.

DETAILED DESCRIPTION OF THE EMBODIMENT

Figure 1:
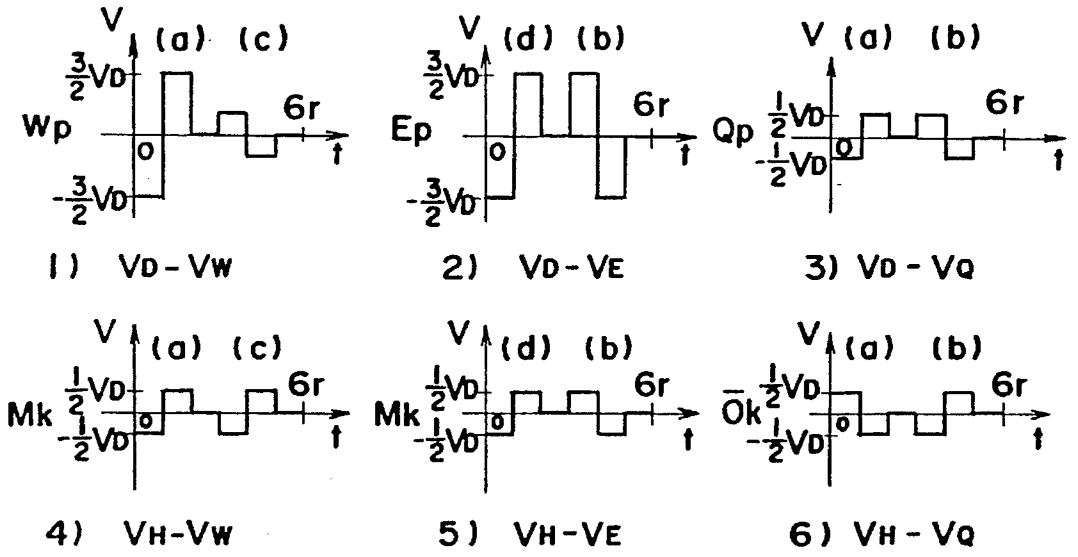
FIG. 1 is a diagram showing various waveforms of voltages applied to picture elements in a preferred embodiment of the present invention.

In the liquid crystal display device 1 employing the ferroelectric liquid crystal, voltages are applied to the scanning electrodes Lp, being selected with the selection time set to 2 Nr (S), for each r (s) in the order of VD1, VD2, . . . , VD2N (N being an integer equal to or greater than 2). To the scanning electrodes Lk (P≠k) not selected, voltages are applied for each r (s) in the order of VH1, VH2, . . . , VH2N. In the case (X) where the picture elements Apj on the scanning electrodes then selected are desired to effect a bright display while a dark display has previously been effected, voltages are to be applied to the signal electrodes Sj for each r (s) in the order of VW1, VW2, VW2N. Alternatively, in the case (Y) where the picture elements Apj on the scanning electrodes then selected are desired to effect a dark display while the bright display has previously been effected, voltages are to be applied to the signal electrodes Sj for each r (s) in the order of VE1, VE2, . . . , VE2N. Also, in the case (Z) where the picture elements Apj on the scanning electrodes then selected are desired to effect a bright display while the bright display has previously been effected, or in the event that the picture elements Apj on the scanning electrodes then selected are desired to effect a dark display while the dark display has previously been effected, voltages are to be applied to the signal electrodes Sj for each r (s) in the order of VQ1, VQ2, . . . , VQ2N.

Voltages applied during the initial Nr (s) to each picture element by these voltages will be discussed. Where the picture elements Apj being selected apply to the case (X) discussed above, voltages are applied to the picture elements Akj (k≠p) being not selected currently r (s) in the order of VH1–VW1, VH2–VW2, . . . , VHN–VWN. Alternatively, where the picture elements Apj being selected apply to the case (Z) discussed above, voltages are applied to the picture elements Akj (k≠p) being not selected currently r (s) in the order of VH1–VQ1, VH2–VQ2, . . . , VHN–VQN, and voltages are applied to the picture elements Apj, being selected, for each r (s) in the order of VD1–VQ1, VD2 –VQ2, . . . , VDN–VQN. Determination is made to fix the voltage to be applied to each picture elements so that optical influences brought by these voltages on the picture elements held in the bright or dark memory states are substantially equal to each other. At this time, where the picture elements Apj then selected apply to the case (X), the voltages are applied to the picture elements Apj for each r (s) in the order of VD1–VW1, VD2–VW2, . . . , VDN–VWN. These voltages are determined by the voltage applied to each picture element so as to establish the following relationship:

$$VDi-VWi=(VDi-VQi)+(VHi-VWi)-(VHi-VQi) \qquad (16).$$

There are voltages suited for the picture elements Apj to be brought into the bright memory state.

Considering the voltage to be applied to each picture element during the latter half Nr (s) of these voltages, the voltage to be applied to the picture elements Apj (k≠p) where the picture elements Apj being not currently selected apply to the case (Y), the voltage to be applied to the picture elements Akj (k≠p) where the picture elements Apj being not currently selected apply to the case (Z), and the voltage to be applied to the picture elements Apj are so determined that optical influences which would be brought thereby on the picture elements held in the bright or dark memory state can be equal to each other. At the time voltages are so determined, and where the picture elements Apj being not currently selected apply to the case (Y), the voltage suitable for placing the picture into a dark memory state can also be determined in a similar manner.

The voltages applied to the picture elements Apj and Akj during the second half Nr (s) where the picture elements Apj being selected apply to the case (X) is made to equal to the voltage applied to the picture elements Apj and Akj where the picture elements Apj being selected apply to the case (Z), and the voltage applied to the picture elements Apj and Akj during the first half Nr (s) where the picture elements Apj being selected apply to the case (Y) is made equal to either of the voltages applied to the picture elements Apj and Akj where the picture elements Apj being selected apply to the case (Z).

Figure 2:
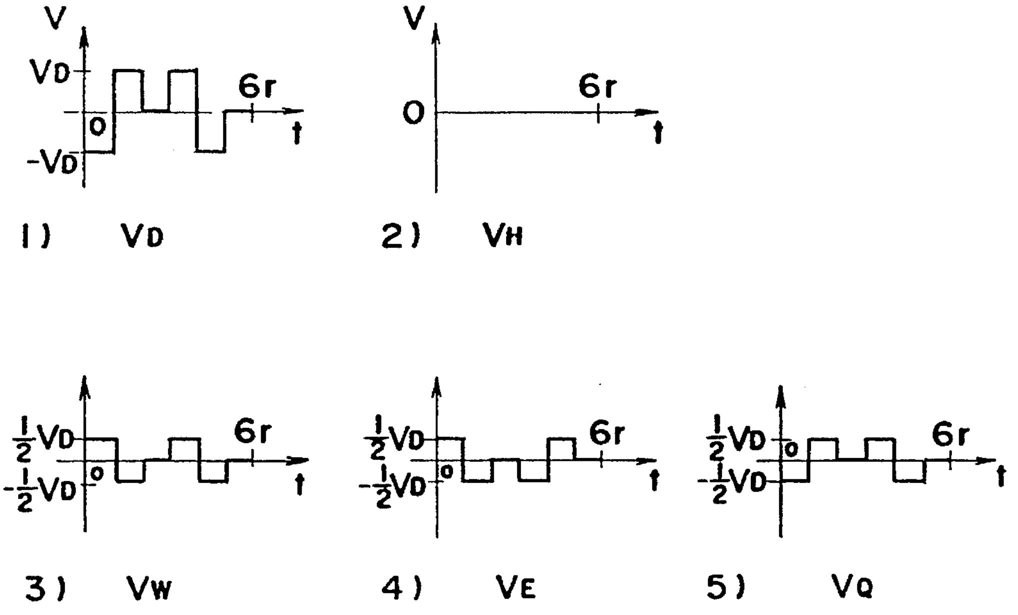
FIG. 2 is a diagram showing various waveforms of voltages applied to various electrodes in the preferred embodiment of the present invention.
Figure 6:
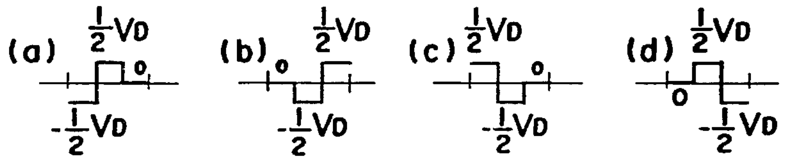
FIG. 6 is a diagram showing various waveforms of voltages at which optical influences on the picture elements in the bright and dark memory states in the embodiment of the present invention are equal to each other.
Figure 7:
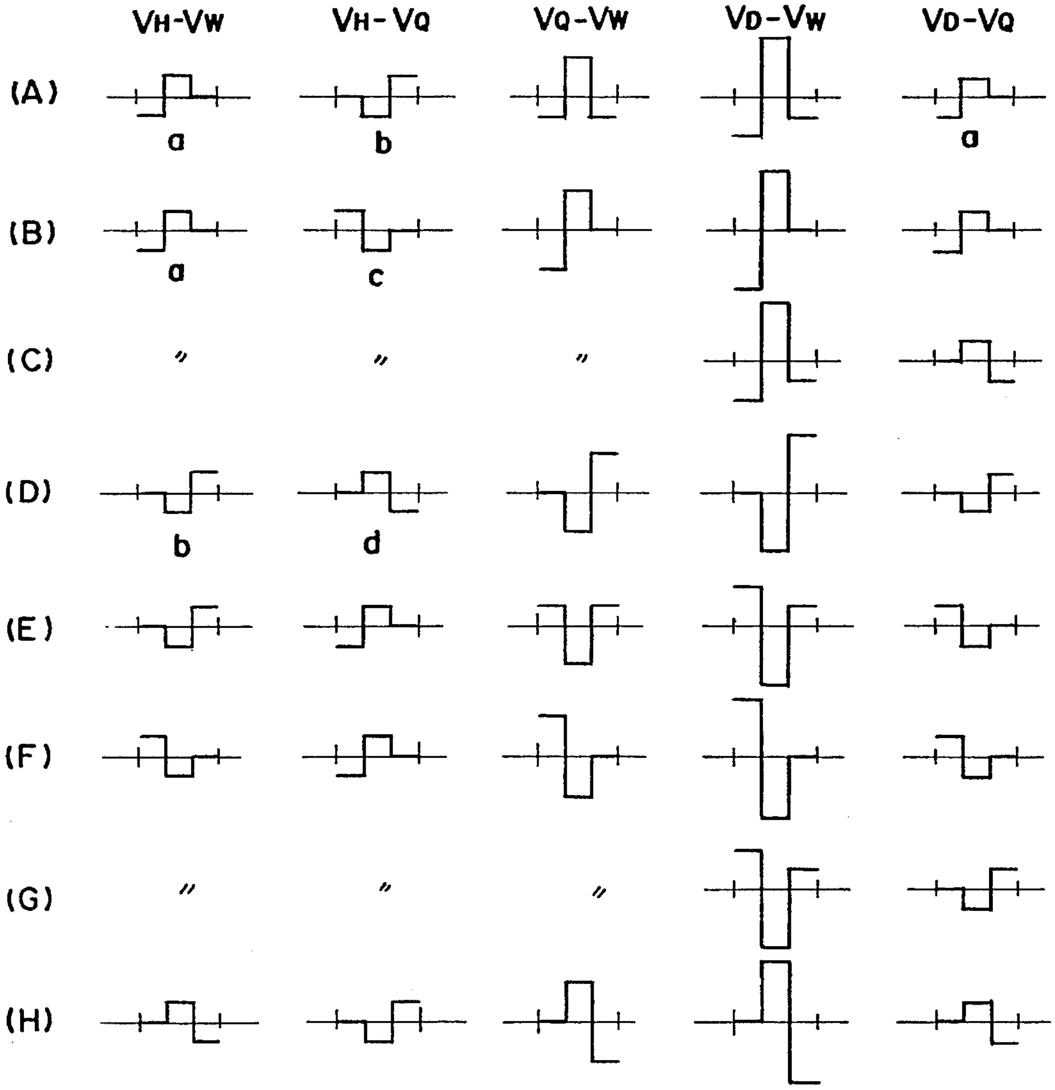
FIG. 7 is a diagram showing desirable combinations of the voltages in the case shown in FIG. 6.
Figure 8:
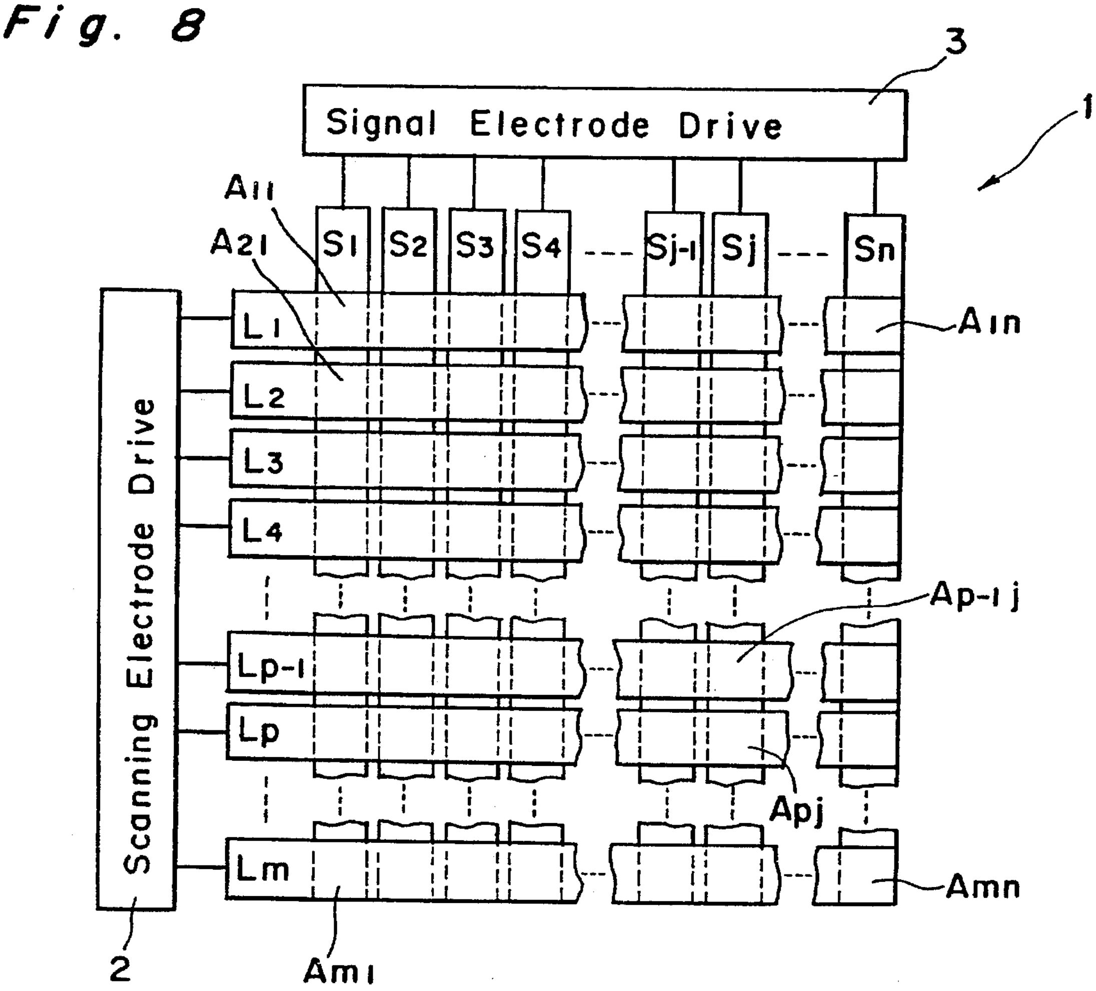
FIG. 8 is a block diagram showing the construction of the liquid crystal display device to which the present invention is applicable.
Figure 9:
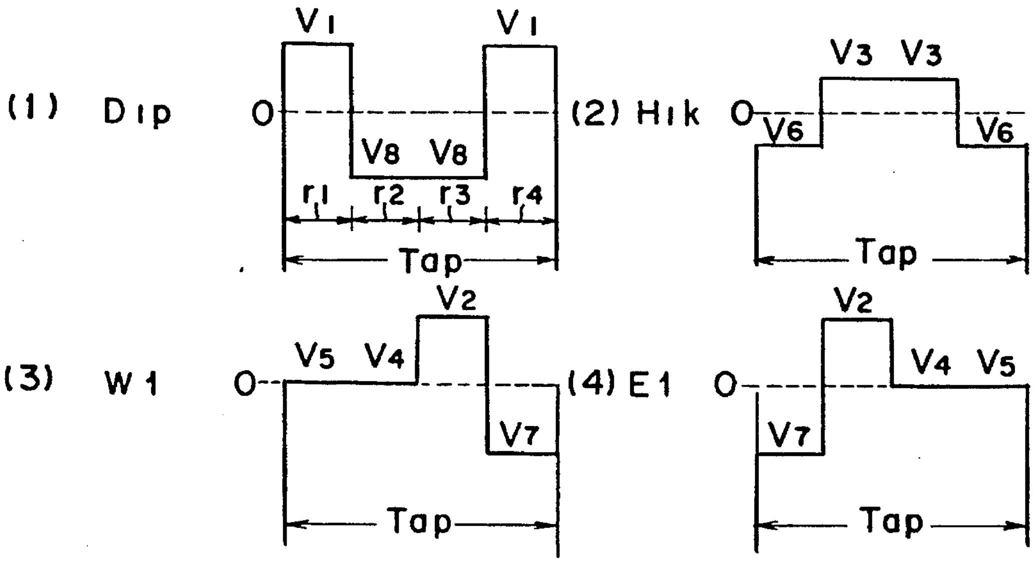
Fig. 9 PRIOR ART
FIG. 9 and FIG. 12 are diagrams showing various waveforms of voltages applied to the various electrodes according to the prior art driving method.
Figure 10:
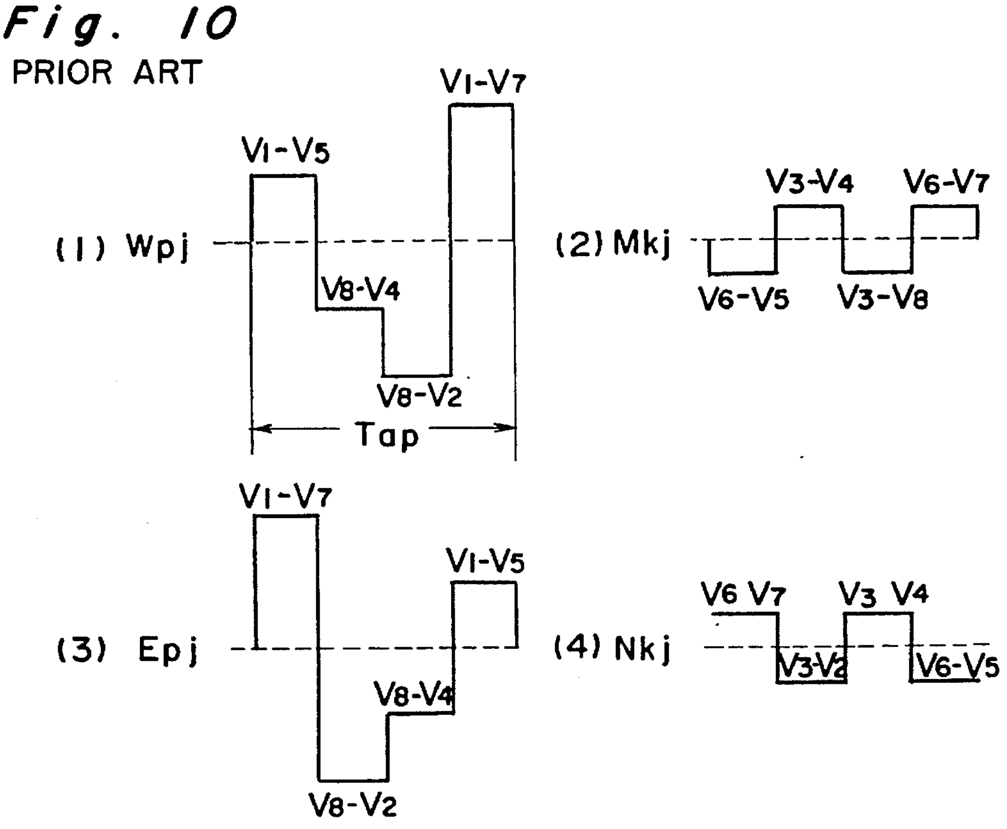
Fig. 10 PRIOR ART
FIG. 10 is a diagram showing various waveforms of voltages applied to the picture elements according to the prior art driving method.
Figure 12:
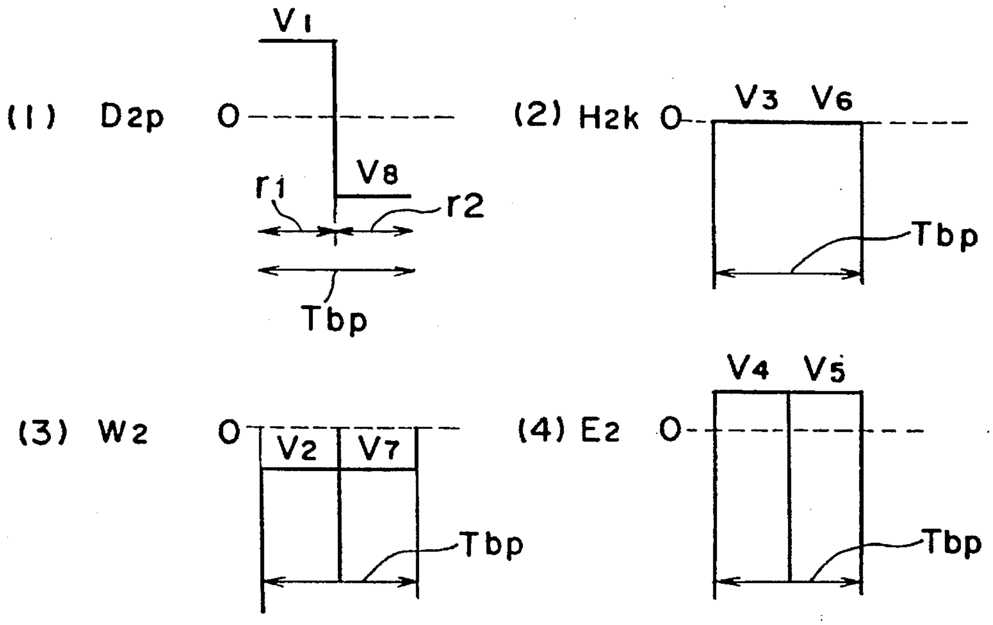
Fig. 12 PRIOR ART
Figure 11:
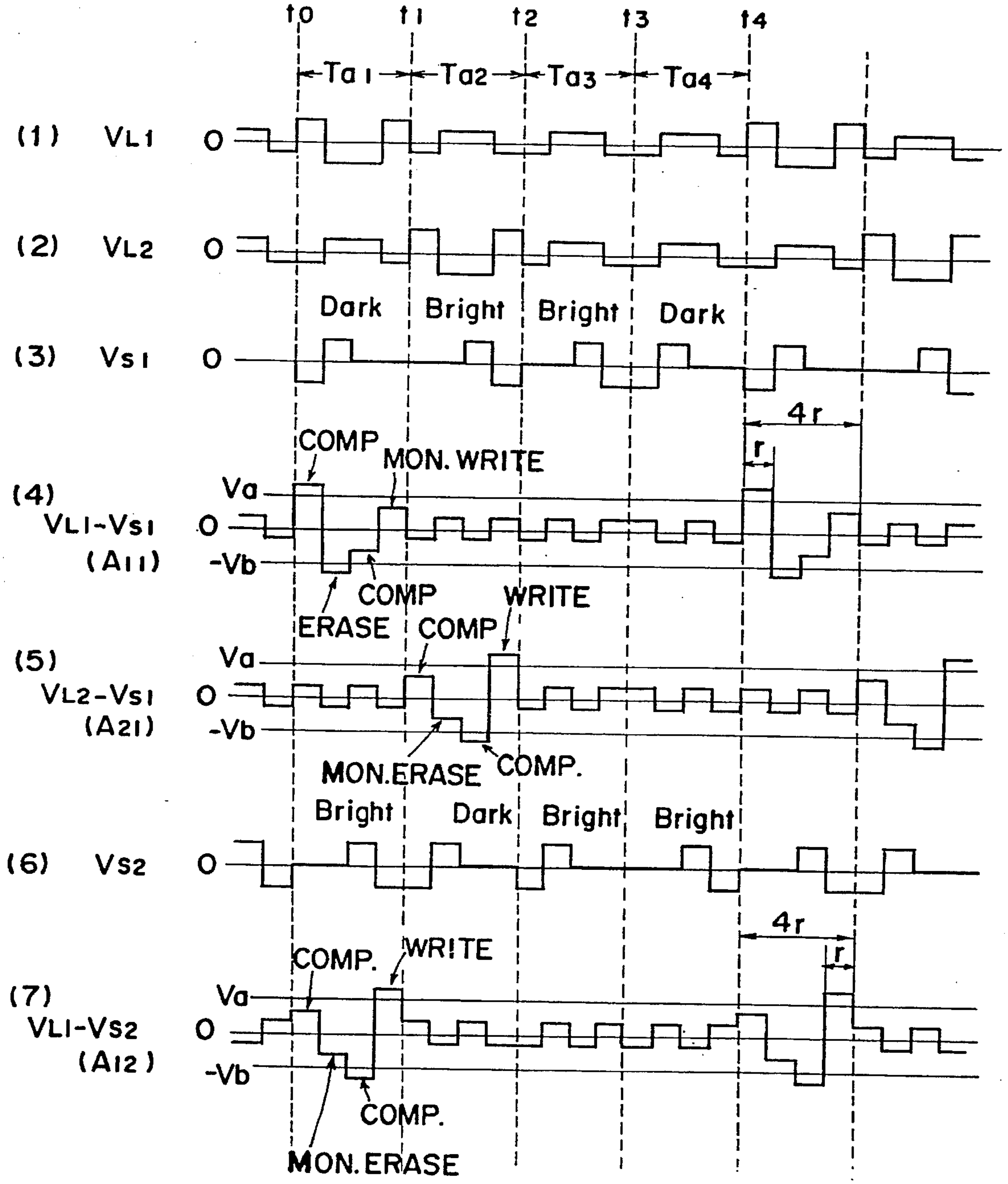
Fig. 11 PRIOR ART
FIG. 11 and FIG. 13 are diagrams showing various waveforms of the voltages in the matrix liquid crystal display device driven according to the prior art method.
Figure 13:
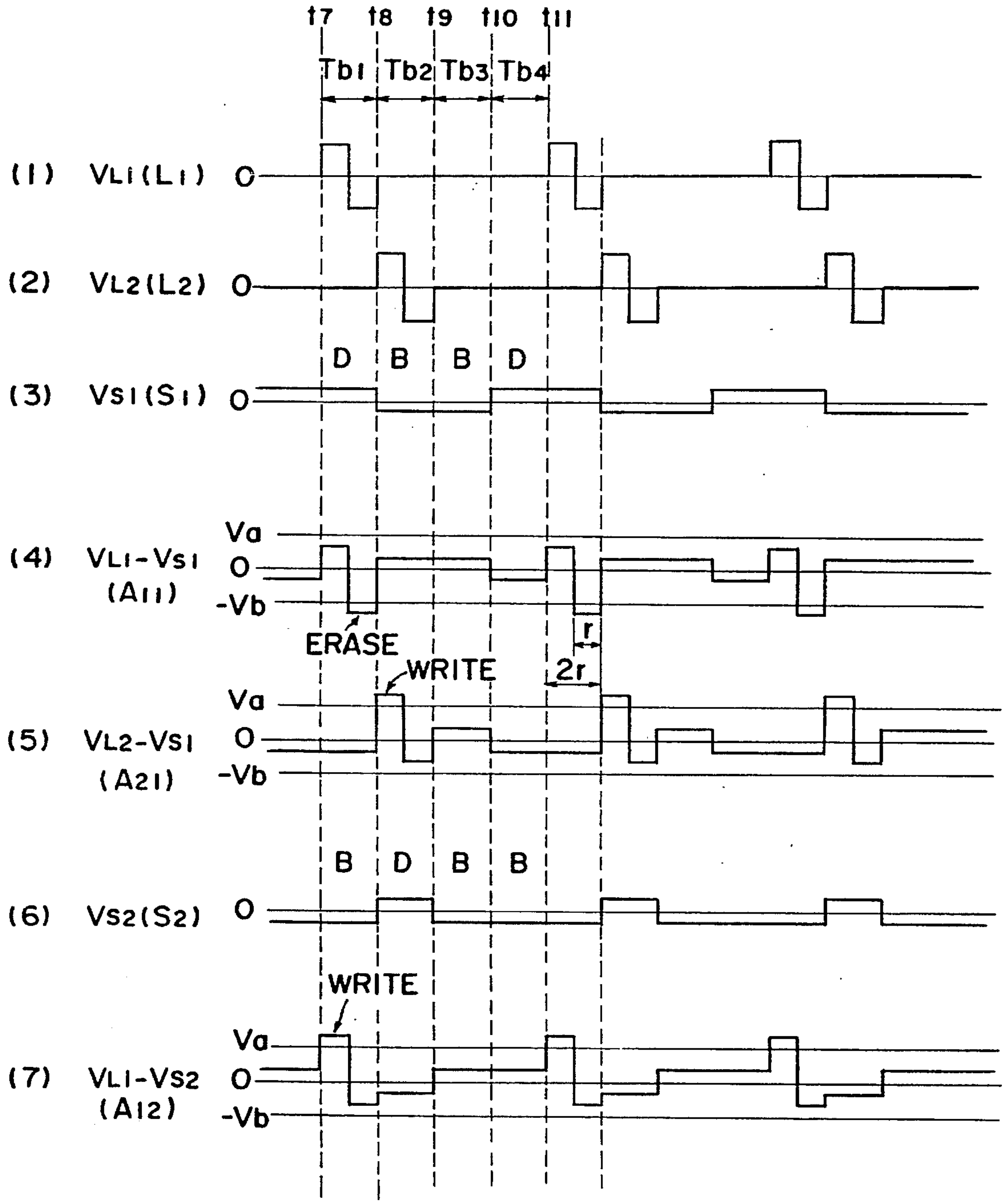
Fig. 13 PRIOR ART
Figure 14:
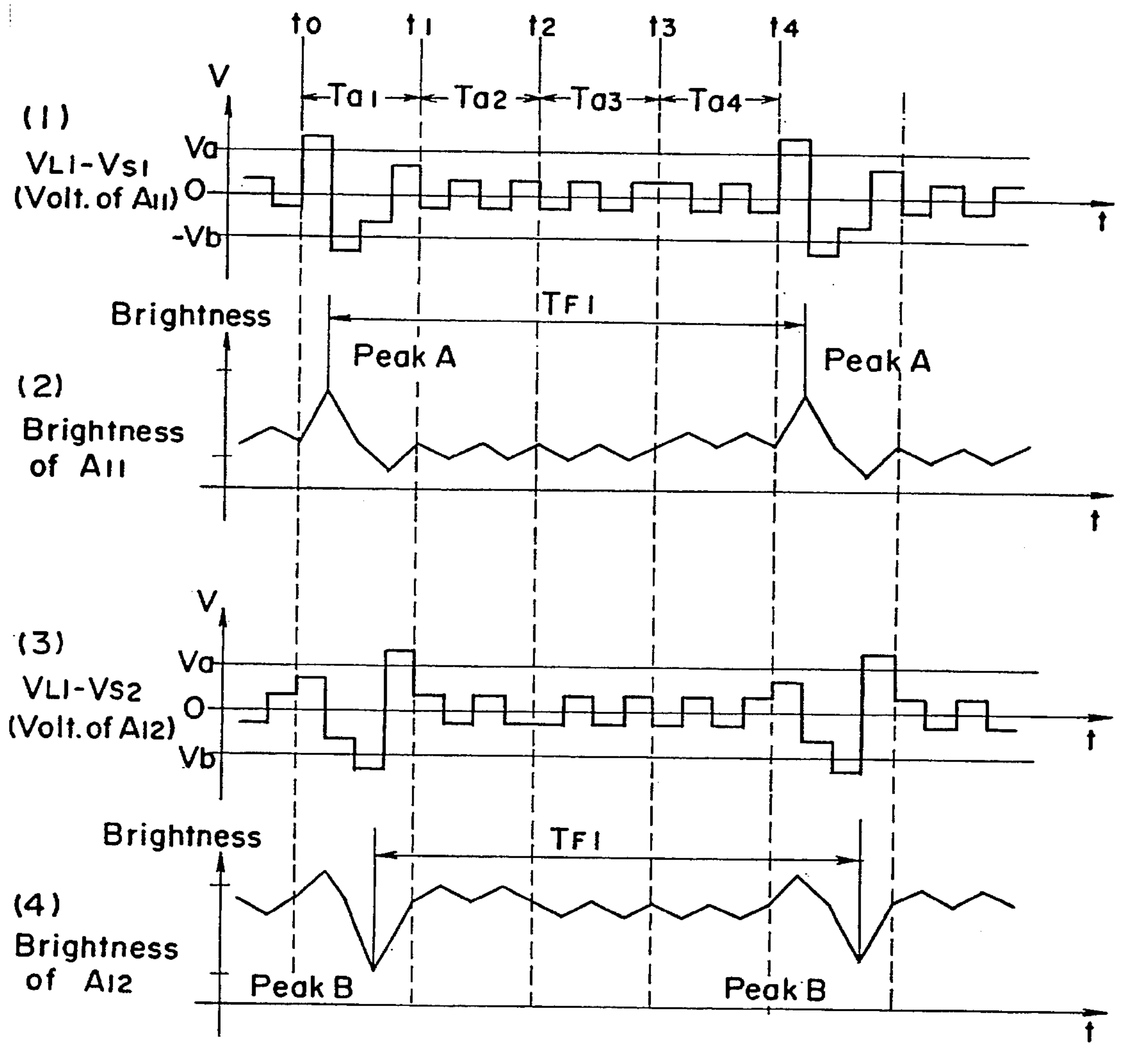
Fig. 14 PRIOR ART
FIGS. 14 and 15 are diagrams descriptive of the brightness of the picture elements of the liquid crystal display device, driven according to the prior art method, which continue bright and dark displays.
Figure 15:
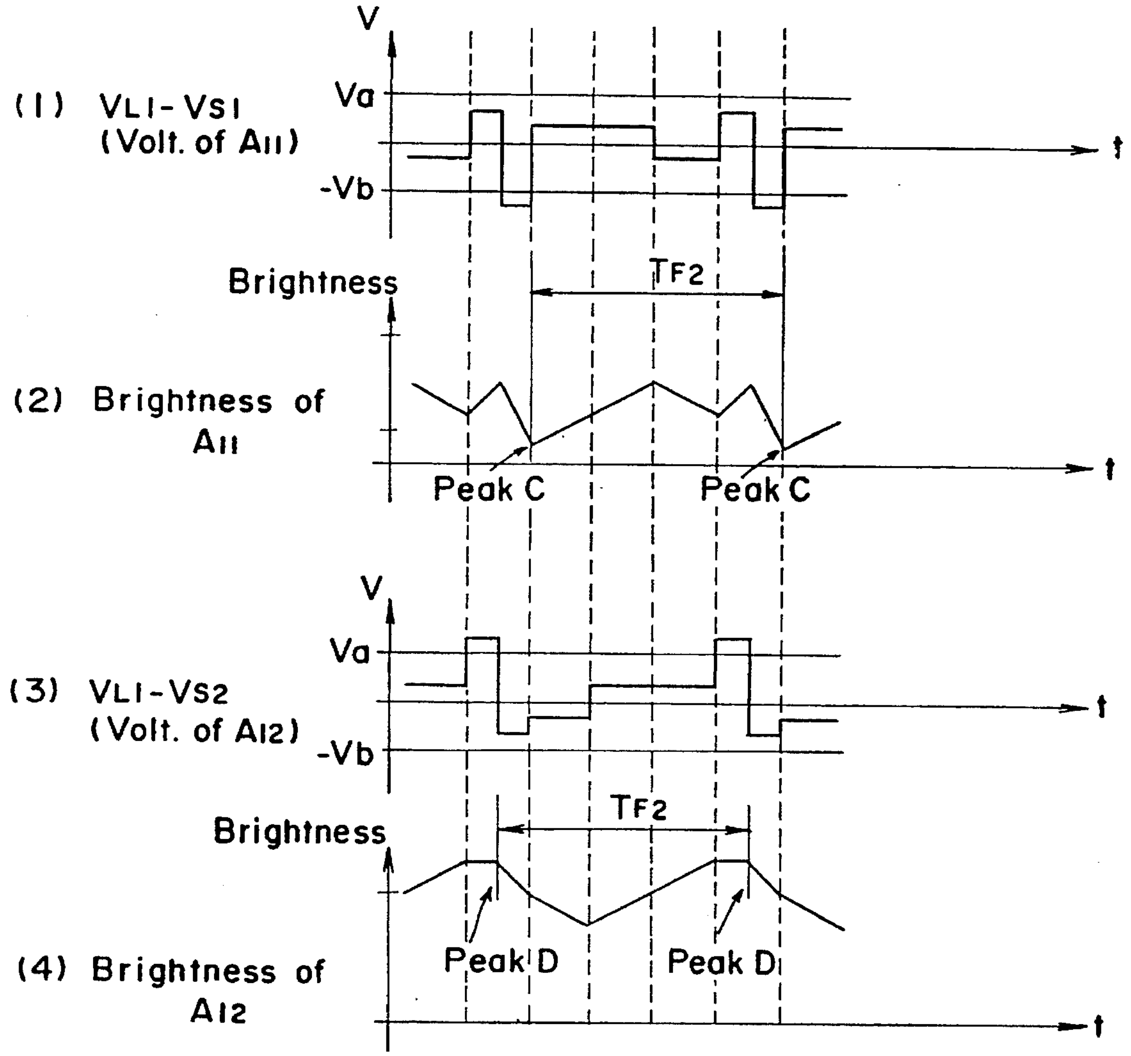
Fig. 15 PRIOR ART

More specifically, at N=3, these voltages are determined. In the first place, let it be assumed that the optical influences brought on the picture elements held in the bright or dark memory state are equal to each other, and (a) to (d) shown in FIG. 6 are selected. Then, using the equation (16), combinations (A) to (H) of voltages shown in FIG. 7 are chosen. Of these voltage combination, the voltage combination (B) is most suited for rendering the picture elements Apj to be in the bright memory state and the voltage combination (F) is most suited for rendering the picture elements Apj to be in the dark memory state. FIG. 1 illustrates waveforms of voltages applied to such picture elements, and the use of the voltage combination (B) shown in FIG. 7 results in the determination of (a) shown in FIG. 1. Then, the substitution of VH–VE and VD–VE for VH–VW and VD–VW in the voltage combination (F) shown in FIG. 7 results in the determination of (b) shown in FIG. 1. Since the last 3 r (s) of VH–VW is equal to VH–VQ, (c), as shown in FIG. 1 is determined. The initial 3 r (s) of VH–VE suffices to be equal to either VH–VE or VH–VQ. Therefore, it is taken that the initial 3 r (s) of VH–VQ is equal to VH–VW for the determination of (d) shown in FIG. 1. In order to determine VD, VH, VW, VE and VQ from these, referring to FIG. 2 showing the waveforms of the voltages applied to the electrodes, VH is determined such as shown by (2) in FIG. 2. By so doing, VW, VE and VQ are determined such as shown by (3), (4) and (5) in FIG. 2 in consideration of the voltages of VH–VW, VH–VW and VH–VQ. With respect to VD, it can be determined such as shown by (1) in FIG. 2 in consideration of VD–VQ.

In this way, if the voltage of the waveform (1) shown in FIG. 2 is applied to the scanning electrodes being selected, and the voltage of the waveform (2) in FIG. 2 is applied to the non-selected scanning electrodes Lk, and if the picture elements Apj on the scanning electrodes being selected are desired to be applicable to the case (X), the application of the voltage of the waveform (3) shown in FIG. 2 to the signal electrodes Sj results in the application of the voltage of the waveform (1) shown in FIG. 1 to these picture elements. Therefore, if $\frac{3}{2}$VD>Va, these picture elements can be set in the bright memory state. Also, where the picture elements Apj on the scanning electrodes being selected are desired to be applicable to the case (Y), the application of the voltage of the waveform (4) of FIG. 2 to the signal electrodes Sj results in the application of the voltage of the waveform (2) of FIG. 1 to these picture elements. Therefore, if –$\frac{3}{2}$VD<–Vb, these picture elements can be set in the dark memory state. The description made so far is substantially identical with that of the prior art. However, according to the prior art, so far as the case (Z) is concerned, the case (Z) has been treated in a manner similar to either the case (X) or the case (Y). The treatment of the case (Z) in a manner similar to the case (X) or (Y) according to the prior art has been found to cause the occurrence of flickering in the liquid crystal display device. On the contrary however, in the present invention, in the event of the case (Z), the voltage of the waveform (5) shown in FIG. 2 is applied to the signal electrodes Sj to cause a voltage of the waveform (3) of FIG. 1 to be applied to the picture elements. Therefore, if ½VD<Va and −½VD<−Vb, these picture elements can be set in the state which has previously been assumed thereby. The voltage applied to the picture elements, up until the corresponding scanning electrodes Lp are subsequently selected, is nothing other than the voltage combinations (4), (5) and (6) shown in FIG. 1. However, since the voltage combination (3) of FIG. 1 and the voltage combinations (4), (5) and (6) of FIG. 1 are so determined that the optical influence brought on the picture elements set in the bright or dark memory state can be equal to each other, no flicker will occur so long as certain picture elements keep the bright memory state. Further, similarly, no flicker will occur so long as certain picture elements keep the dark memory state.

While according to the prior art the number m of the scanning electrodes has been determined in consideration of the necessity of the frame frequency being higher than 60 (Hz) at which no human eyes will perceive a flicker, the present invention is such that, even when the frame frequency is 10 (Hz), no one watching the picture elements kept in the bright or dark memory state will perceive the occurrence of flickering. In other words, according to the present invention, the determination of the frame frequency at a value higher than 60 (Hz) is no longer necessary and the number m of the scanning electrodes can be arbitrarily chosen. By way of example, if using the ferroelectric liquid crystal having a unit time r=100 (μs) cells on the 200 scanning electrodes are to be displayed, the frame frequency will attain the following value when N=3;

$$\begin{aligned} F &= 1/(2Nr \times m) \\ &= 1/(2 \times 3 \times 100 \times 10^{-6} \times 200) \\ &= 8.3\ (\text{Hz}) \end{aligned}$$

or, if m=400, the frame frequency will attain the following value when N=3.

$$\begin{aligned} F &= 1/(2Nr \times m) \\ &= 1/(2 \times 3 \times 100 \times 10^{-6} \times 400) \\ &= 4.1\ (\text{Hz}) \end{aligned}$$

Since the reciprocal 1/F of the frame frequency can be considered a response, the increase of the number m of the scanning electrodes will pose a problem associated with the delay in response. However, the scanning electrodes in a number twice, or greater than twice that of the prior art can be advantageously driven.

Where N is equal to or greater than 4, although in the voltage combinations (1), (2), (3) and (4) shown in FIG. 2 the period during which the voltage is zero has been shown as occurring during each r (s) when N is 3, the voltage to be applied to the electrodes can readily be available if the period during which the voltage is zero when N=4 or N=5 is added by r (s) or 2 r (s), respectively. Even in these cases, the greater N is, the lowered the response, however, the number of the electrodes to be driven can be advantageously chosen arbitrarily.

In other words, the present invention has been aimed at removing the limitation imposed on the number of the scanning electrodes due to the occurrence of flickers. Further, it has been aimed at enabling the increase of the number of the scanning electrodes that can be driven.

Hereinafter, an example wherein the system of the present invention is employed to drive the ferroelectric liquid crystal display device will be described.

Figure 3:
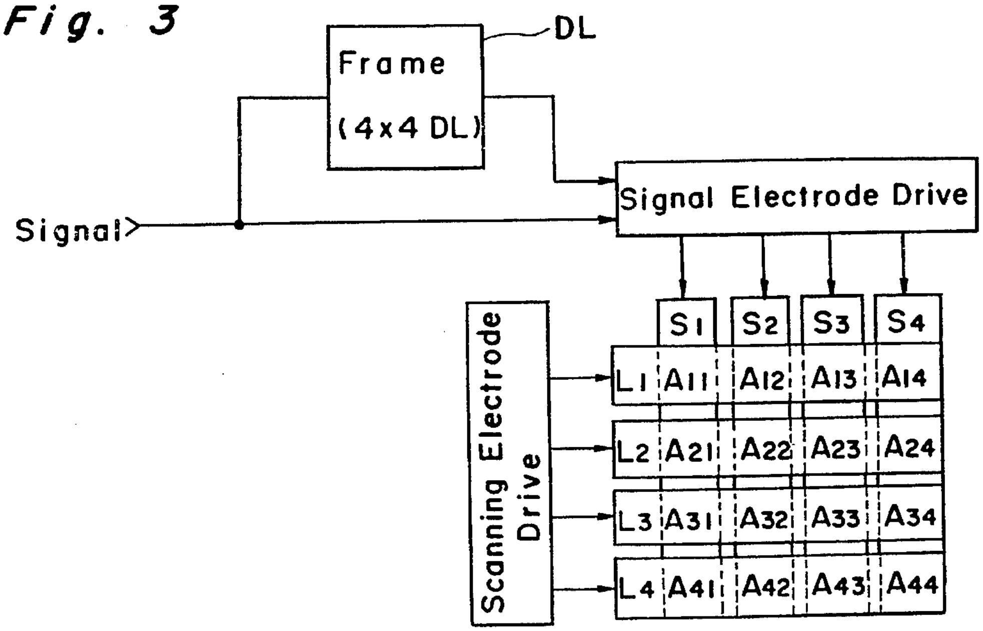
FIG. 3 is a schematic block diagram showing a construction of a liquid crystal display device to which the present invention is applied.
Figure 4:
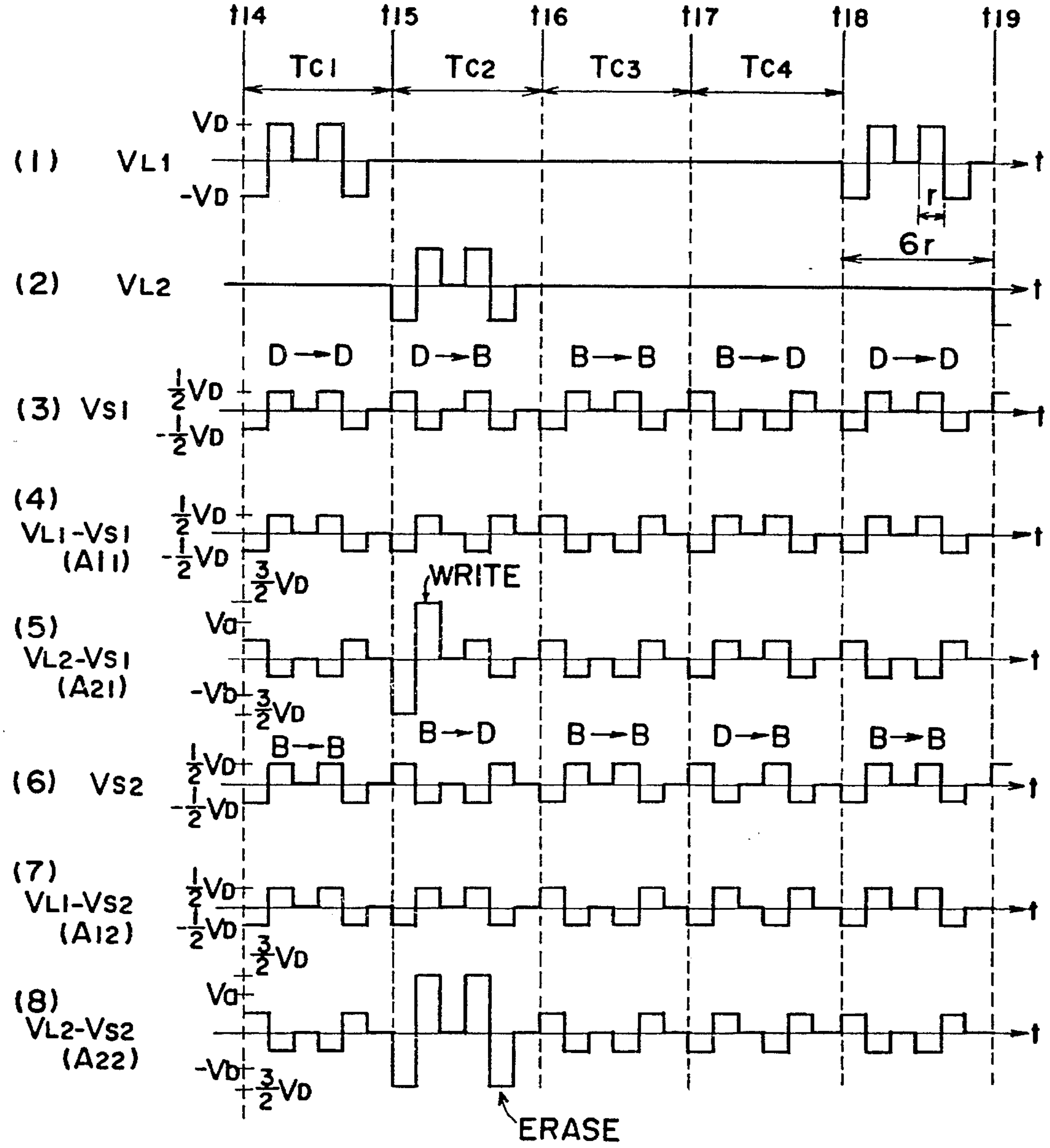
FIG. 4 is a diagram showing various waveforms of voltages in a matrix liquid crystal display device to which the present invention is applied.

For the purpose of simplification, the liquid crystal display device 1 is assumed to have the 4×4 picture elements, the construction of which is schematically shown in FIG. 3. In this liquid crystal display device 1, a frame DL (which can be manufactured by the use of a random access memory) of the 4×4 picture elements is employed as a means for indicating which one of the bright and dark displays each picture element on the respective scanning electrode then selected has previously effected. In this liquid crystal display device 1, if the voltage to be applied to the scanning electrodes Lp (p=l, 2, 3, 4) being selected and the voltage to be applied to the scanning electrodes Lk (k≠p, k=l, 2, 3, 4) which are not selected are such as shown by (1) and (2) in FIG. 2, the voltage of the waveform (3) in FIG. 2 is applied to the signal electrodes Sj where the picture elements Apj are desired to be applicable to the case (X), the voltage of the waveform (4) in FIG. 2 is applied to the signal electrodes Sj where the picture elements Apj are desired to be applicable to the case (Y), or the voltage of the waveform (5) in FIG. 2 is applied to the signal electrodes Sj where the picture elements Apj are desired to be applicable to the case (Z). Results of application of the voltages at the different cases (X), (Y) and (Z) are illustrated in FIG. 4. As can be understood from FIG. 4, in any one of the cases (X) and (Y), the voltage of 3/2VD and the voltage of −3/2VD are applied to the picture elements Apj for r (s). Also, the picture elements Apj in the case (Z) and the picture elements in any one of the cases (X), (Y) and (Z) are applied with the voltage of ½VD and −½VD for r (s). Therefore, if the voltage VD is so chosen as to satisfy the following relationships, voltages shown by WRITE and ERASE in the waveforms (5) and (8) in FIG. 4 can be utilized to change the memory state of the picture elements.

$$½VD<Va<3/2VD \qquad (17.1)$$

$$-3/2VD<Vb<-½VD \quad (17.2)$$

As far as the waveforms (3) and (7) shown in FIG. 4 are concerned, no change occur in the memory state of the picture elements.

Figure 5:
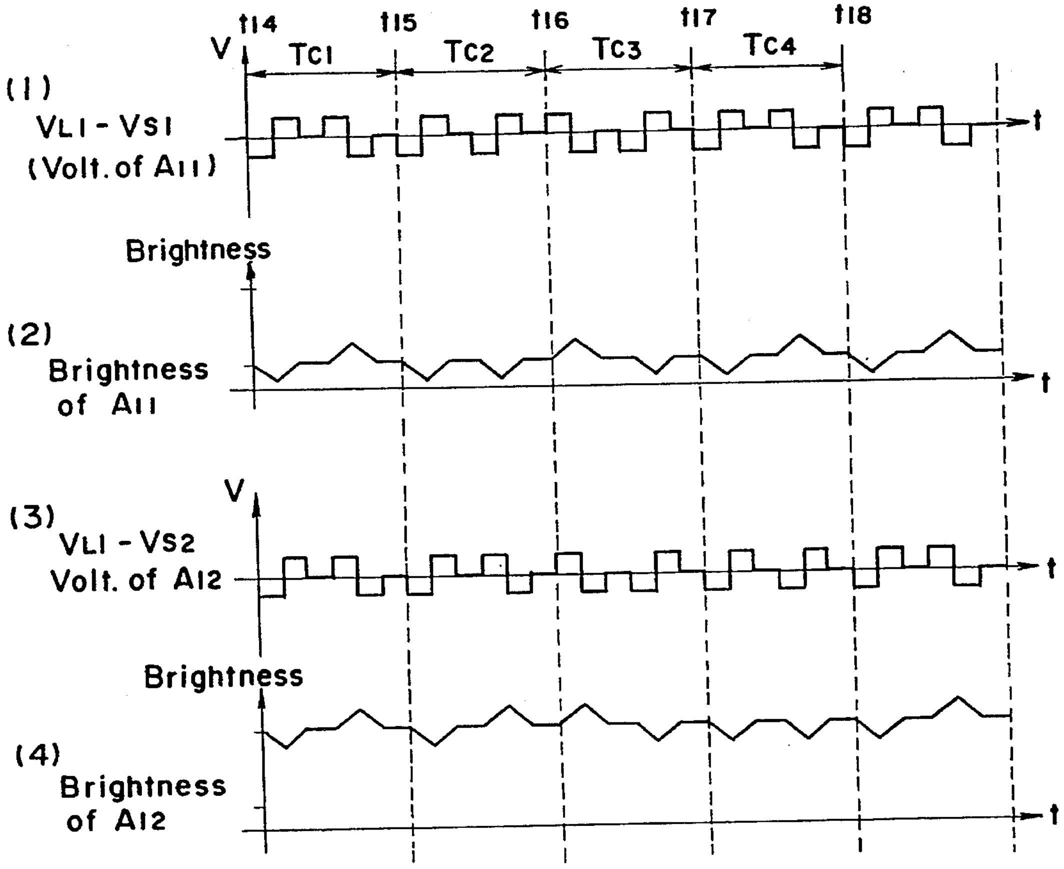
FIG. 5 is a diagram descriptive of the brightness of the picture elements continuously kept to effect a bright or dark display in the matrix liquid crystal device to which the present invention is applied.

What illustrates the relationship between the application of the voltage of the waveform (3) shown in FIG. 4 and the brightness of the picture elements is (1) and (2) shown in FIG. 5. As can be understood from the waveform (2) in FIG. 5, the use of the driving method according to the present invention ensures no occurrence of peaks in brightness during a frame cycle. Accordingly, no matter what the frame cycle is 1/10 (s) or ⅕ (s), no flicker will be perceived. The relationship between the application of the voltage of a waveform (7) shown in FIG. 4 and the brightness of the picture elements is shown by (3) and (4) in FIG. 5 and, even in this case, no flicker will be perceived similarly. Meanwhile, the combinations of the voltage waveforms shown in FIGS. 1 and 2 are only but one embodiment of the present invention.

If the frame cycle is too long, a problem would arise when the picture elements are rewritten such as in any one of the cases (X) and (Y). In view of this, if the response R in the present invention is defined as equal to TF and when the relationship between the number m of the scanning electrodes and the unit time r is determined, the following result can be obtained:

$$R=6r\times m.$$

When m=200 and r=100 (μs), the response R will be 0.12 (ms). This response is comparable to the response exhibited by the existing TN-LCD or STN-LCD and is therefore agreeable. Moreover, if the lowering of the response will not be taken into consideration seriously, the use of the present invention makes it possible to accomplish a display with m=400. Even if the unit time r (s) of the ferroelectric liquid crystal is reduced in the future, the maximum number m of the scanning electrodes employable according to the prior art system will be:

$$m \leqq \frac{1}{60} \times \frac{1}{2r} \quad (18).$$

In contrast thereto, according to the present invention, if the response R is chosen to be 0.1 (ms), the maximum number of the scanning electrodes employable will be:

$$m \leqq R/6r = \frac{1}{10} \times \frac{1}{6r} \quad (19).$$

and, thus, it is clear that the scanning electrodes, the number of which is at least twice that according to the prior art, can be driven.

When the matrix type LCD cells (ZL1-3489, manufactured by Merk) were in actuality driven by the use of the voltages shown in FIG. 4, they could be successfully driven without any problems associated with the rewriting and the flicker.

From the foregoing description, it is clear that, according to the present invention, distinction is made to three display patterns of bright and dark states assumed by the picture elements on the selected scanning electrodes during the current and previous times, and the voltage to be applied to the picture elements on the selected scanning electrodes and the voltage to be applied to the picture elements on the non-selected scanning electrodes are so chosen that no significant difference may occur in the optical influence which would be brought on the picture elements in the bright and dark memory states. Accordingly, even when the frame frequency is lower than 60 (Hz), no flicker will be perceived. Therefore, the number of the scanning electrodes can be advantageously increased arbitrarily.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined in the appended claims, unless they depart therefrom.

What is claimed is:

1. A method of driving a liquid crystal display device including a ferroelectric display material, a plurality of parallel scanning electrodes disposed in a first direction, a plurality of parallel signal electrodes intersecting the plurality of parallel scanning electrodes and disposed in a second direction perpendicular to the first direction, and picture elements formed at each signal and scanning electrode intersection, each picture element being switched to a bright display state, when a voltage difference between a scanning and signal electrodes associated with the picture element exceeds a first threshold voltage (+Va), and being switched to a dark display state, when said voltage difference falls below a second threshold voltage (−Vb), wherein the first threshold voltage is greater than the second threshold voltage, said method comprising the steps of:

(a) storing a previous display state for each picture element;

(b) determining, for each picture element, one of three previous to new display state scenarios, wherein, (i) a first scenario (X), occurs when the previous and new display states of the picture element are a dark display state and a bright display state, respectively, (ii) a second scenario (Y), occurs when the previous and new display states of the picture element are a bright display state and dark display state, respectively, and (iii) a third scenario (Z), occurs when the new display state of the picture element is the same as the previous display state;

(c) applying a first voltage pattern when said first scenario (X) is determined, the first voltage pattern having a peak voltage greater than the first threshold voltage, wherein an integrated value of the first voltage pattern is equal to zero;

(d) applying a second voltage pattern when said second scenario (Y) is determined, the second voltage pattern having a peak voltage smaller than the second threshold voltage, wherein an integrated value of the second voltage pattern is equal to zero; and (e) applying third voltage patterns when said third scenario (Z) is determined, the third voltage patterns having a peak voltage between the first and second threshold voltages, wherein an integrated value of the third voltage patterns is equal to zero, the third voltage patterns applied to picture elements of a selected scanning electrode and a non-selected scanning electrode respectively having the same waveform and opposite polarities.

2. A method of driving a liquid crystal display device including a ferroelectric display material, a plurality of parallel scanning electrodes disposed in a first direction, a plurality of parallel signal electrodes, intersecting the plurality of parallel signal electrodes, disposed in a second direction perpendicular to the first direction, and picture elements formed at each signal and scanning electrode intersection, said method comprising the steps of:

a) selecting, sequentially, each of the plurality of scanning electrodes to be driven and subsequently applying a first driving voltage thereto and applying a second driving voltage to non-selected scanning electrodes;

b) receiving, in a delay device, an input present display state and outputting a previous display state for each of the plurality of picture elements;

c) receiving, in a driving device, both an input present display state and the previous display state from the delay device for each of the plurality of picture elements;

d) applying a first rewrite voltage to the plurality of signal electrodes from the driving device to change a picture element corresponding to each selected scanning electrode from a first display state to a second display state upon receiving a first display state as the previous display state and a second display state as the input present display state, and maintaining a picture element corresponding to each non-selected scanning electrode in a same display state as that of the previous display state;

e) applying a second rewrite voltage, different from said first rewrite voltage, to the plurality of signal electrodes from the driving device to change a picture element corresponding to each selected scanning electrode from said second display state to said first display state upon receiving a second display state as the previous display state and a first display state as the input present display state, and maintaining a picture element corresponding to each non-selected scanning electrode in a same display state as that of the previous display state; and f) applying a non-rewrite voltage to the plurality of signal electrodes from the driving device to maintain a picture element corresponding to each selected and non-selected scanning electrode in one of a first and second display state upon receiving the same one of the first and second display state, respectively, as both the previous and the input present display state, a voltage patterns applied to picture elements of a selected scanning electrode and a non-selected scanning electrode respectively having the same waveform and opposite polarities.

3. The method of claim 2, wherein the steps d–f of maintaining a picture element in the same display state are achieved by application of a voltage of a constant absolute value.

4. The method of claim 3, wherein the absolute value of the voltage applied to the picture elements maintained in the same display state in steps d–f is zero.

5. The method of claim 3, wherein the absolute value of the voltage applied to maintain picture elements in the same display state in steps d–f is a bipolar waveform formed of at least one positive voltage waveform and at least one negative voltage waveform.

* * * * *